May 14, 1929.　　　T. F. BARTON　　　1,713,162
SYSTEM OF ELECTRICAL DISTRIBUTION
Filed Oct. 27, 1927
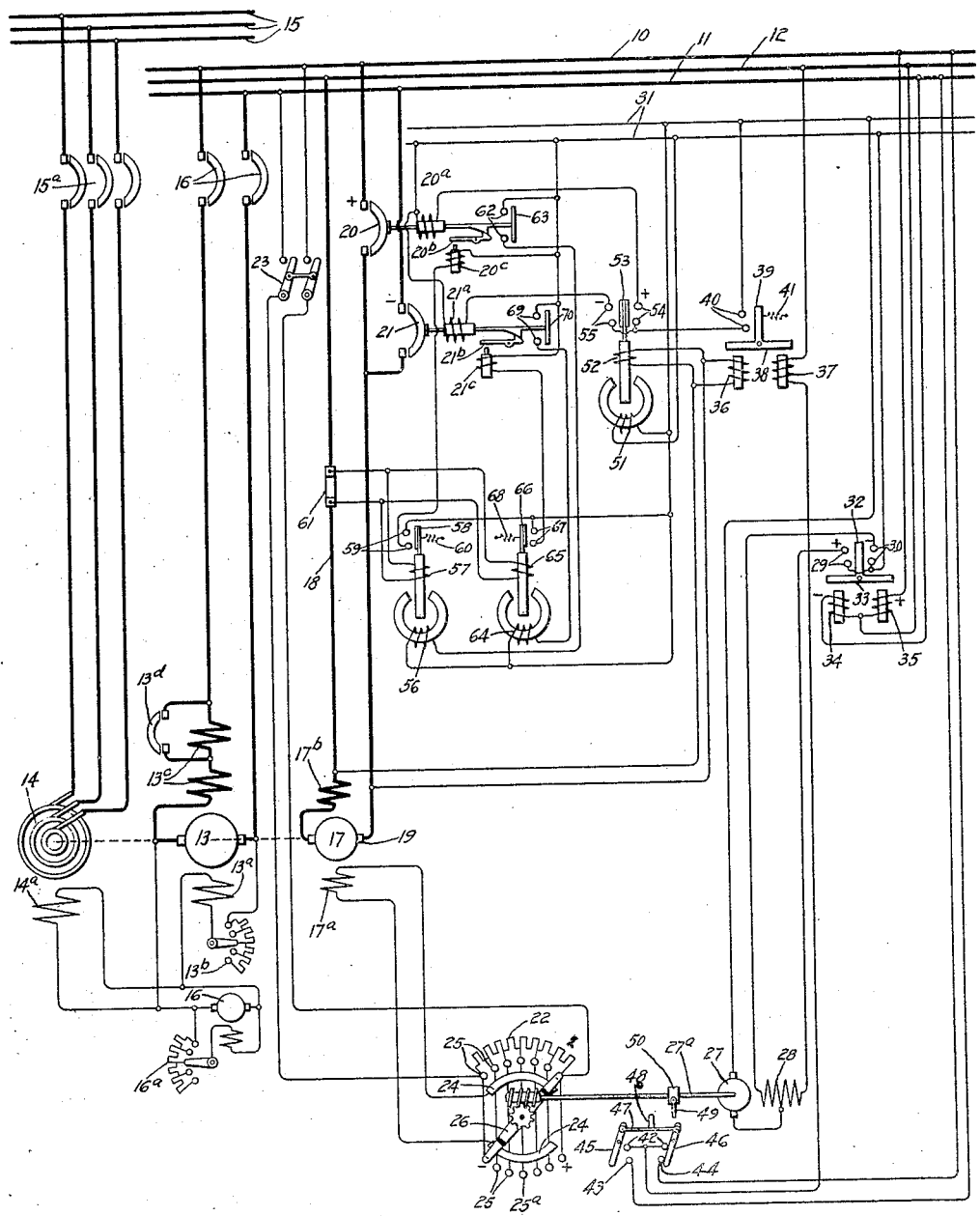
Inventor:
Theophilus F. Barton,
by
His Attorney.

Patented May 14, 1929.

1,713,162

UNITED STATES PATENT OFFICE.

THEOPHILUS F. BARTON, OF UPPER MONTCLAIR, NEW JERSEY, ASSIGNOR TO GENERAL ELECTRIC COMPANY, A CORPORATION OF NEW YORK.

SYSTEM OF ELECTRICAL DISTRIBUTION.

Application filed October 27, 1927. Serial No. 229,224.

The voltage difference between the neutral conductors and each of the main conductors of a three-wire system should remain equal under different conditions of loading It has been the practice, heretofore, to maintain these voltages equal or balanced by providing a balancer set comprising two dynamo-electric machines connected in series between the positive and negative main conductors with their adjacent terminals connected to the neutral conductor, the armatures of the machines being mechanically connected and the field exciting windings thereof being connected to the system in such manner as to cause the balancers to act as a motor generator set to increase the difference in voltage between the neutral conductor and one or the other of the main conductors to balance the system.

An object of my invention is to provide an improved three-wire direct current system of distribution in which the voltage is maintained in balance by a generator adapted to be connected between the neutral conductor and the one of the main conductors across which the voltage is less than across the neutral conductor and the other main conductor, and having means associated therewith for varying the voltage of the balancer in response to an unbalance in said system until the system is balanced. Such an arrangement enables me to effectively maintain the three-wire system in balance with a single generator connected to the three-wire system instead of two dynamo-electric machines connected to such a system as used heretofore. Moreover this balancer can be driven by any suitable source of mechanical power such as a steam turbine or alternating current motor which may be available and it frequently occurs that a motor or turbine in the station where the balancer is to be placed can be used to drive the balancer in addition to the load already connected thereto so that the balancer only is required in addition to the machines already installed.

Further objects and advantages of my invention will become apparent from the following description taken in connection with the accompanying drawing in which the single figure is a diagrammatic view of a three-wire direct current system embodying my invention.

Referring to the drawing, the system of distribution shown, which is intended to be merely illustrative of one manner of carrying out my invention, comprises positive and negative main conductors 10 and 11 respectively and a neutral conductor 12. The load connected to the system is supplied by a main generator 13 which is driven by any suitable means, such as an alternating current motor 14 connected to the mains 15 through circuit breakers 15$^a$. The generator 13 is connected across the main conductors 10 and 11 of the three-wire system through circuit breakers 16. The excitation system for the motor and the generator comprises circuits including the field exciting windings 13$^a$ and 14$^a$ of the generator and motor respectively, winding 13$^a$ being connected in series with an exciter 16$^a$ and the armature of generator 13, and winding 14$^a$ being connected across the terminals of the exciter, the exciter being provided with the field rheostat 16$^a$ for varying its terminal voltage. The excitation system of the generator 13 also includes a differential series field winding 13$^c$ provided with a short circuiting switch 13$^d$ for rendering a portion of the series winding inactive.

When the load between the neutral conductor and each of the main conductors is equal the system will be balanced, that is to say the voltage between the neutral conductor and each of the main conductors will be equal, but if these loads become unequal the system will tend to become unbalanced. The voltage between the neutral conductor and each of the main conductors is maintained in balance, in accordance with my invention by providing a balancer consisting of a single generator 17 driven by any available source of mechanical power, as for instance by the motor 14 which drives the main generator. This balancer is adapted to be connected between the neutral conductor and the one of said main conductors across which the voltage is less than across the neutral conductor and the other main conductor in response to an unbalance in the system, the terminal voltage of the balancer being varied automatically in response to an unbalance in the system after it is connected thereto until the system is balanced. In the particular arrangement shown the balancer is provided with a field exciting winding 17$^a$ and a differential series field exciting winding 17$^b$. One terminal of the balancer 17 is connected by a conductor 18 directly to the neutral conductor 12 of the three-wire system, and the other terminal 19 is connected to circuit breakers 20 and 21, the former being adapted to complete a circuit between the balancer and the positive main conductor 10, and the latter being adapted to complete a circuit between the balancer and the negative main conductor 11.

One of the circuit breakers 20 or 21 is closed to complete a circuit between the terminal 19 of the balancer and the one of the main conductors across which and the neutral conductor the voltage difference is least in response to an unbalance in the system by an arrangement to be hereinafter more fully described. It is, therefore, necessary to make the polarity of the terminal 19 of the balancer the same as the one of the main conductors to which it is connected. I do this by reversing connections between the field exciting winding 17ª and a portion of the resistance element 22 which is connected across the main conductors 10 and 11 through a switch 23. In this construction the field exciting winding 17ª is connected to arcuate contacts 24 which are arranged adjacent interconnected contacts 25. The contacts 25 are connected to the resistance element 22 and insulated contacts carried by a pivoted arm 26 are adapted to bridge the contacts 24 and 25 so as to connect the exciting winding across a portion of the resistance 22 and reverse the connections when the arm 26 is moved from one side to the other of a contact 25ª. It is apparent that when the arm 26 is on the contact 25ª that the field winding 17ª will be short circuited. However the arrangement is such that when the arm 26 is in the position shown to the left of contact 25ª the polarity of the terminal 19 of the balancer is negative, and when it is moved to the right of the contact 25ª the polarity of the terminal 19 of the balancer is positive. The arm 26 of the field rheostat is operated by a motor 27 having a series field exciting winding 28 which is provided with a middle tap connected to one terminal of the motor and each terminal of the winding connected to one of the contacts 29 and 30 respectively of a balanced relay. One terminal of the motor 27 is connected directly to a direct current low voltage source of potential 31 and the other terminal of the motor is adapted to be connected to this source of potential across contacts 29 or 30. If the circuit to the motor 27 is completed through the contacts 30 it will cause the motor 27 to rotate in such direction that the arm 26 will be turned to the left of the contact 25ª which will energize the field winding 17ª so as to make the terminal 19 of the balancer negative. On the other hand if the circuit between the motor and the source of potential 31 is completed through the contact 29 the motor 27 will be rotated in the opposite direction moving the arm 26 to the right of contact 25ª and exciting the field winding 17ª so as to make the terminal 19 of the balancer positive.

In order to make the polarity of the terminal 19 of the balancer the same as the one of the main conductors across which and the neutral conductor the voltage is least, the contacts 29 and 30 of the balanced relay are controlled by a pivoted contact arm 32 adapted to bridge the contacts 29 or 30. The contact arm 32 is connected to a pivotally supported armature 33 having actuating coils 34 and 35 arranged at opposite ends of the armature. The coil 34 is connected between the neutral conductor 12 and the negative main conductor 11, and the coil 35 is connected between the neutral conductor 12 and the positive main conductor 10. By this arrangement when the three-wire system becomes unbalanced, if the voltage difference between the positive conductor and the neutral conductor becomes less than that between the negative conductor and the neutral conductor, the end of the armature 33 will be tilted toward the coil 34 and thereby complete the circuit between the motor 27 and the source of potential 31 by bridging contacts 29 which will operate the motor 27 so as to move the rheostat arm 26 to the right of the contact 25ª making the terminal 19 of the balancer positive. On the other hand, if the difference in voltage between the negative main conductor and the neutral conductor becomes less than that between the neutral conductor and the positive main conductor the armature 33 will be tilted by the action of the coil 35 so as to complete the circuit between the motor 27 and the source of potential 31 by causing the contact arm 32 to bridge the contacts 30, which will move the arm 26 to the left of the contact 25ª making the terminal 19 of the balancer negative. It will thus be seen that when the system becomes unbalanced the terminal 19 of the balancer will be made of the same polarity as the one of the main conductors across which and the neutral conductor the difference in voltage is least.

After the polarity of the balancer 19 is made the same as the one of the main conductors to which it is to be connected, if the circuit is completed between them before the voltage of the balancer is as great or greater than the voltage difference between the neutral conductor and this main conductor, the balancer would merely become an added load on the system which would tend to increase the unbalance in the system. I avoid this by arranging a balanced relay with one coil 36 connected across the terminals of the balancer and another coil 37 connected between the neutral conductor and the one of the main conductors of the same polarity as the terminal 19 of the balancer so that the circuit breaker connecting the terminal 19 to the main conductor of the same polarity is not closed until the terminal voltage of the balancer is as great or greater than the voltage difference between the neutral conductor and the main conductor of the same polarity as the terminal 19. This balanced relay comprises a pivoted armature 38 having a contact arm 39 adapted to bridge contacts 40 for closing the circuit breakers 20 or 21 depending on the polarity of the terminal 19 of the balancer and a spring 41 which normally retains the arm 39 out of engagement with the circuit breaker controlling contacts 40. The coils 36 and 37 tend to tilt the armature 38 in opposite directions and the spring 41 opposes the coil 36, so that the force exerted by the coil 36 tending to tilt the armature 38 must be greater than the force exerted by the coil 37 and the spring 41 connected thereto before the contact arm 39 can be made to bridge the contacts 40. The relay is so designed that the terminal voltage of the balancer 17 is required to be as great or slightly greater than the voltage difference between the neutral conductor and the one of the main conductors of the same polarity as the terminal 19, to which the coil 37 is connected, before the contact arm 39 is caused to bridge the circuit breaker controlling contacts 40. The necessary electrical relation between the coils 36 and 37 is maintained by connecting one terminal of the coil 37 directly to the neutral conductor 12 and the other terminal to contacts 42 of a switch having a contact 43 connected to the positive main conductor 10 and the contact 44 connected to the negative main conductor 11. The contacts of these switches are controlled by pivoted arms 45 and 46 that are connected by a bar 47 having a projection 48 extending from its mid-portion in the path of a spring finger 49 carried by a block 50 which is threaded on the shaft 27$^a$ of the motor 27. The block 50 with its spring finger 49 is arranged on the shaft 27$^a$ so that when the motor 27 moves the arm 26 of the field rheostat over the contact 25$^a$ that the spring finger 49 is snapped over the projection 48 so as to bring one or the other of the pivoted arms 45 and 46 into engagement with their respective contacts. It will be apparent that as long as the arm 26 of the field rheostat is on the left of the contact 25$^a$, as shown in the drawing, the arm 46 will continue to bridge the contacts 42 and 44 completing the circuit between the coil 37 and the negative main conductor 11, which corresponds to the polarity of the terminal 19 of the balancer when the rheostat arm is in this position. On the other hand when the bar 33 of the balanced relay is tilted so as to cause the contact arm 32 to bridge the contacts 29, the motor 27 will swing the arm 26 to the right of the contact 25$^a$ making the terminal 19 of the balancer positive, at the same time moving the block 50 along the shaft 27$^a$ so as to cause the spring finger 49 to engage the projection 48, swing the arms 45 and 46 so as to open the circuit between contacts 42 and 44 and bridge the contacts 42 and 43 for completing the circuit between the coil 37 and the positive main conductor. As the contact arm 32 of the balanced relay controls the motor 27 so as to make the terminal 19 of the balancer the same polarity as the main conductor across which and the neutral conductor the voltage difference is least and the contact arms 45 or 46 completes the circuit between the neutral conductor and the same main conductor through the coil 37, it follows that the voltage of the balancer applied to coil 36 is balanced by the voltage difference between the neutral conductor and the main conductor of the same polarity so that the circuit breaker controlling contacts 40 are not bridged until the voltage of the balancer is as great or greater than the voltage difference between the neutral conductor and the main conductor of the same polarity as the terminal 19 of the balancer.

The circuit breakers 20 and 21 for connecting the terminal 19 of the balancer to the positive and negative main conductors are closed by coils 20$^a$ and 21$^a$ respectively, and the breakers are retained in this position, after being closed, by latches 20$^b$ and 21$^b$. In order to close the circuit breaker connecting the terminal 19 to the main conductor of the same polarity when the contacts 40 are bridged by the contact arm 39, one of the contacts 40 is connected directly to the source of potential 31 and each of the coils 20$^a$ and 21$^a$ have one terminal connected to this source of potential. The other of the contacts 40 is connected to the other terminals of the actuating coils 20$^a$ and 21$^a$ by circuits including contacts 54 and 55 of a polarized relay one of the former of these contacts being connected to the coil 20$^a$ of the circuit breaker 20, and one of the latter of these contacts being connected to the coil 21$^a$ of the circuit breaker 21. This polarized relay is provided with a fixed coil 51 connected across the source of potential 31 and a pivoted element having a coil 52 and a contact arm 53 thereon adapted to bridge contacts 54 and 55. The arrangement is such that when the contact arm 53 bridges contacts 54 a circuit is completed between one of the contacts 40 and the circuit breaker actuating coil 20$^a$ so that bridging contacts 40 at this time closes circuit breaker 20 connecting terminal 19 to the positive main conductor. However, when the contact arm 53 bridges contacts 55 a circuit is completed between one of the contacts 40 and the circuit breaker actuating coil 21ᵃ so that bridging the contacts 40 in this position of the contact arm 53 closes the circuit breaker 21 connecting the terminal 19 to the negative main conductor. The coil 51 of the polarized relay is connected across the source of potential 31, and the coil 52 is connected across the terminals of the balancer, the coil 52 being connected so that when the terminal 19 of the balancer is positive the contact arm 53 bridges contacts 54 completing a circuit between one of the contacts 40 and circuit breaker actuating coil 20ᵃ, and when the terminal 19 is negative the contact arm 53 bridges contacts 55 completing a circuit between one of the contacts 40 and circuit breaker actuating coil 21ᵃ. It is to be noted, however, that although the polarized relay will bridge the contacts 54 as soon as the terminal 19 of the balancer becomes positive and that it will move from this position to that in which it bridges the contacts 55, as soon as the terminal 19 becomes negative, the circuit breaker actuating coil connected to one of the contacts 40 by the contact arm 53 in this manner is not energized until contacts 40 are bridged by the arm 39. The contacts 40 are bridged after the voltage of the balancer becomes at least as great as the voltage between the neutral conductor and the one of the main conductors of the same polarity as the terminal 19, the coils 36 and 37 and spring 41 of the polarized relay being designed to give this effect, as previously explained.

After the balancer 17 has been connected between the neutral conductor 12 and one of the main conductors the contact arm 32 of the balanced relay continues to bridge contacts 20 or 39 and increase the terminal voltage of the balancer by operating the rheostat motor 27 until the system is balanced, at which time the contact arm 32 opens the circuit to the motor 27. The load on the three-wire system may then change and unbalance the system so that the difference in voltage between the other main conductor of the system and the neutral conductor is less than the difference in voltage between the main conductor to which the balancer is connected and the neutral conductor. This will cause the armature 33 of the balanced relay to be tilted to one side or the other and operate the rheostat motor 27 so as to move the arm 26 toward the contact 25ᵃ and reduce the voltage of the balancer below that between the neutral conductor and the main conductor to which the terminal 19 is connected. Upon reducing the voltage of the balancer in this manner current flows from the positive main conductor to the neutral conductor operating the balancer as a motor, so that the balancer should then be disconnected from the system. In order to disconnect the balancer from the system under this condition I provide means responsive to a predetermined electrical relation between the balancer and the three-wire system for disconnecting the balancer therefrom, which in this instance comprises polarized relays arranged to trip the circuit breakers 20 or 21 upon a flow of current from the positive main conductor through the balancer to the neutral conductor, or from the neutral conductor through the balancer to the negative main conductor. The arrangement which I have shown for convenience in illustration comprises a polarized relay having a fixed coil 56 and a movable element having a coil 57 and a contact arm 58 thereon adapted to control the trip coil 20ᶜ of the circuit breaker 20 by bridging the contacts 59 to complete a circuit between the trip coil 20ᶜ and the source of potential 31, the contact arm 58 being normally retained out of engagement with the contacts 59 by a spring 60. The coil 57 on the movable element of the polarized relay is connected across a resistance element 61 in the conductor 18 connecting the balancer to the neutral conductor 12, the coils 56 and 57 being arranged so that when current flows from the positive conductor through the balancer to the neutral conductor that the contact arm 58 will bridge the contacts 59 and energize the trip coil 20ᶜ so as to open the circuit breaker 20. The coil 56 is connected across the source of potential 31 through contacts 62 which are adapted to be bridged by contact arm 63 on the circuit breaker 20 so that the coil 57 of the polarized relay will not move the contact arm 58 so as to bridge the contacts 59 and energize the coils 20ᶜ unless the circuit breaker 20 is closed. The circuit breaker 21 is also tripped by a polarized relay having a fixed coil 64 and a movable element having a coil 65 and a contact arm 66 thereon adapted to bridge contact 67 for completing a circuit between the trip coil 21ᶜ of the circuit breaker 21 and the source of potential 31, the contact arm 66 being normally retained out of engagement with the contact 67 by the spring 68. The coil 65 is connected across the resistance 61 and is arranged relative to the fixed coil 64 of the polarized relay so that when the current flows from the neutral conductor through the balancer to the negative main conductor the contact arm 66 is caused to bridge the contact 67 and energize the trip coil 21ᶜ for opening the circuit breaker 21. The fixed coil 64 of the polarized relay is connected across the source of potential 31 through contacts 69 which are adapted to be bridged by contact arm 70 carried by the circuit breaker 21 so that the contact arm 66 will not bridge the contact 67 for energizing the trip coil 21ᶜ unless the circuit breaker 21 is closed. When the terminal 19 of the balancer is connected to the positive main conductor and its voltage becomes less than the voltage difference between the neutral conductor and the positive main conductor, current flows through the balancer from the positive main conductor to the neutral conductor causing the contact arm 58 to bridge the contact 59 and open the circuit breaker 20. On the other hand, if the terminal 19 of the balancer is connected to the negative main conductor 11 when its voltage is reduced in this way current will flow from the neutral conductor through the balancer to the negative main conductor and cause the contact arm 66 to bridge the contact 67, tripping the circuit breaker 21. It will thus be seen that the polarized relays for controlling the circuit breakers 20 and 21 disconnect the balancer from the system so that it does not operate as a motor connected to the system and so that it may be reconnected to maintain the system in balance.

In the operation of the system which I have described, the laternating current motor is connected to the alternating current mains 15 by closing the circuit breakers 15ᵃ, and brought up to speed by a suitable starting arrangement. The exciter 16 is then caused to energize the field exciting windings 13ᵃ and 14ᵃ of the generator 13 and motor 14 respectively. The generator voltage is adjusted to the correct value by varying the field resistance 13ᵇ, whereupon it is connected across the main conductors 10 and 11 of the three-wire system by closing the circuit breakers 16. The switch 23 is then closed so as to energize the field winding 17ᵃ of the balancer 17 through the resistance 22 of the reversing field rheostat. If the load on the three-wire system is balanced the difference in voltage between the neutral conductor and each of the main conductors will be equal and the contact arm 32 of the balanced relay will be maintained in its mid-position between the contacts 29 and 30 so as to open circuit the reversing rheostat motor 27, and maintain the voltage of the balancer below the difference in voltage between the neutral conductor and the main conductor of the same polarity as the terminal 19 of the balancer so that the balancer will remain disconnected from the system. However, if the rheostat arm 26 is initially in the position shown in the drawing, for maximum voltage with the terminal 19 negative, the coil 36 will cause the contact arm 39 to bridge the contacts 40 against the action of the coil 37 connected between the neutral conductor and the negative main conductor. The terminal 19 of the balancer being negative the contact arm 53 of the polarized relay bridges the contacts 55 so that bridging the contacts 40 completes the circuit breaker operating coil 21ᵃ, so as to close the breaker 21 and connect the terminal 19 of the balancer to the negative main conductor. It is apparent that if the system were balanced initially that connecting the balancer in this way would unbalance the system and cause the contact arm 32 of the balanced relay to bridge the contacts 29 and operate the reversing rheostat motor 27 so as to reduce the voltage of the balancer by turning the rheostat arm 26 toward the contact 25ᵃ. This would cause a flow of current from the negative main conductor through the balancer to the neutral conductor, thereby energizing the coil 65 of the polarized relay so as to cause the contact arm 66 to bridge the contact 67 and trip the circuit breaker 21 and disconnect the terminal 19 of the balancer from the negative main conductor. The loading and voltage on the system being balanced the voltage of the balancer would not be changed as the equal voltages applied to the coils 34 and 35 of the balanced relay would maintain the contact arm 32 in its mid-position between the contacts 29 and 30 and maintain the reversing rheostat motor on open circuit. If the rheostat arm 26 were initially in its position for maximum voltage with the terminal 19 negative the circuit breaker 21 would be closed and opened in a similar manner to that described above.

Upon increasing the load between the neutral conductor and the positive main conductor 10 above that between the neutral and negative conductors the system will become unbalanced making the voltage between the neutral conductor and the positive main conductor less than the voltage between the neutral conductor and the negative main conductor. This will cause the coil 34 to move the contact arm 32 of the balanced relay so as to bridge the contacts 29 and operate the reversing rheostat motor 27 making the terminal 19 of the balancer positive. In changing the polarity of the terminal 19 of the balancer in this way the spring finger 49 carried by the block 50 will be brought into engagement with the projection 48 and connect the coil 37 of the balanced relay between the neutral conductor and the positive main conductor. The contact arm 32 will continue to bridge the contacts 29 and increase the voltage of the balancer with the terminal 19 thereof positive until the coil 36 causes the contact arm 39 to bridge the contacts 40, which will complete a circuit to the actuating coil 20ᵃ of the circuit breaker, as the contact arm 53 of the polarized relay bridges the contacts 54 during the time that the terminal 19 of the balancer is positive. Completing a circuit to the actuating coil 20ᵃ in this way closes the circuit breaker 20 and connects the terminal 19 of the balancer to the positive main conductor 10. If the system does not immediately become balanced the contact arm 32 of the balanced relay will continue to bridge the contacts 29 and operate the reversing rheostat motor 27 so as to continue increasing the voltage of the balancer until the system is balanced. When the system is balanced the contact arm 32 of the balanced relay will be maintained in its mid-position between the contacts 29 and 30 and open circuit the reversing rheostat motor 27 which will stop the increase in voltage of the balancer.

In the event of the load changing when the terminal 19 is connected to the positive main conductor and decreasing the voltage between the neutral conductor and the positive main conductor, then the contact arm 32 of the balanced relay bridges contacts 29 and again increases the voltage of the balancer. On the other hand, if the system becomes unbalanced by the voltage between the neutral conductor 12 and the negative main conductor 11 becoming less than the voltage between the neutral conductor and the positive main conductor, then the contact arm 32 of the balanced relay bridges the contacts 30 and operates the reversing rheostat motor 27 to reduce the voltage of the balancer 17. Reducing the voltage of the balancer 17 in this manner results in current flowing from the positive main conductor through the balancer to the neutral conductor and causes the contact arm 58 to bridge the contacts 59 and energize the trip coil 20ᶜ of the circuit breaker 20 so as to disconnect the terminal 19 from the positive main conductor. If this balances the system the balancer will remain disconnected from the system. However, if the voltage between the negative conductor and the neutral conductor remains less than the voltage between the neutral conductor and the positive main conductor the contact arm 32 of the balanced relay will continue to bridge the contacts 30 until the polarity of the terminal 19 is negative and the voltage of the balancer is increased sufficiently to cause the contact arm 39 of the balanced relay to bridge the contacts 40 against the action of the coil 37 connected between the neutral conductor and the negative main conductor. As the contact arm 53 of the polarized relay will bridge contacts 55 as soon as the terminal 19 of the balancer becomes negative, bridging the contacts 40 will energize the actuating coil 21ᵃ for closing the circuit breaker 21, thereby connecting the terminal 19 of the balancer to the negative main conductor. The contact arm 32 will then continue to bridge contacts 30 and increase the voltage of the balancer until the system is balanced. After the terminal 19 of the balancer is connected to the negative main conductor, if the voltage between the neutral conductor and the negative main conductor becomes higher than the voltage between the negative conductor and the positive main conductor, the contact arm 32 of the balanced relay bridges the contacts 29 and operates the reversing rheostat motor 27 so as to decrease the voltage of the balancer below the voltage between the neutral and negative main conductor. Decreasing the voltage of the balancer at this time causes a flow of current from the neutral conductor through the balancer to the negative conductor which causes the contact arm 66 of the polarized relay to bridge the contact 67 and trip the circuit breaker 21, disconnecting the terminal 19 of the balancer from the system. If disconnecting the balancer balances the system, the contact arm 32 of the balanced relay is maintained in its mid-position between the contacts 29 and 30 which open circuits the the reversing rheostat motor 27 so that the balancer remains disconnected from the system. But if the system is unbalanced so that the difference in voltage between the negative conductor and the neutral conductor is less than the voltage difference between the neutral conductor and the positive main conductor the balancer will be connected to the latter and balance the system as previously explained.

Various modifications of the embodiment of my invention which I have described will occur to those skilled in the art. I desire it to be understood, therefore, that my invention is not to be limited to the particular arrangement shown and described, and I intend in the appended claims to cover all modifications which do not depart from the spirit and scope of my invention.

What I claim as new and desire to secure by Letters Patent of the United States, is:—

1. In a three-wire system of electrical distribution comprising positive and negative main conductors and a neutral conductor, a balancer, means for connecting said balancer between the said neutral conductor and one of said main conductors in response to a predetermined electrical relation between said balancer and said system, and means for varying the voltage of said balancer in response to an unbalance in said system until the system is balanced.

2. In a three-wire system of electrical distribution comprising positive and negative main conductors and a neutral conductor, a balancer, means for adjusting the voltage of said balancer, and means for connecting said balancer to said system in response to an unbalance in said system and a predetermined relation of the voltage of said balancer to the voltage between said neutral conductor and one of said main conductors.

3. In a three-wire system of electrical distribution comprising positive and negative main conductors and a neutral conductor, a balancer, means for adjusting the voltage of said balancer, means for connecting said balancer to said system in response to an unbalance in said system and a predetermined relation of the voltage of said balancer to the voltage between said neutral conductor and one of said main conductors, and means for disconnecting said balancer from said system in response to a predetermined electrical relation between said balancer and said system.

4. In a three-wire system of electrical distribution comprising positive and negative main conductors and a neutral conductor, a balancer, means for connecting said balancer between said neutral conductor and one of said main conductors in response to an unbalance in said system, and means for disconnecting said balancer from said system in response to a predetermined relation of the voltage of said balancer to the voltage between said neutral conductor and one of said main conductors.

5. In a three-wire system of electrical distribution comprising positive and negative main conductors and a neutral conductor, a balancer, means for connecting said balancer between said neutral conductor and one of said main conductors in response to an unbalance in said system, and means for disconnecting said balancer from said system in response to a rise in voltage between said neutral conductor and the main conductor to which said balancer is connected above the voltage of said balancer.

6. In a three-wire system of electrical distribution comprising positive and negative main conductors and a neutral conductor, a balancer, means for connecting said balancer to said system in response to unbalance in said system and a predetermined relation of the voltage of said balancer to the voltage between said neutral conductor and one of said main conductors, and means for varying the voltage of said balancer in response to an unbalance in said system until said system is balanced.

7. In a three-wire system of electrical distribution comprising a positive and negative main conductors and a neutral conductor, a balancer having one terminal connected to said neutral conductor, means responsive to an unbalance in said system for making the other terminal of said balancer the same polarity as the one of said main conductors across which and the neutral conductor the voltage difference is least, and means responsive to a predetermined relation between the voltage of said balancer and the voltage difference between said one of the main conductors and said neutral conductor for connecting said balancer across them.

8. In a three-wire system of electrical distribution comprising positive and negative main conductors and a neutral conductor, a balancer having one terminal connected to said neutral conductor, means responsive to an unbalance in said system for making the other terminal of said balancer the same polarity as the one of said main conductors across which and the neutral conductor the voltage difference is least, means responsive to a predetermined relation between the voltage of said balancer and the voltage difference between said one of the main conductors and said neutral conductor for connecting said balancer across them, and means for disconnecting said balancer from said main conductor in response to a predetermined electrical relation between said balancer and said system.

9. In a three-wire system of electrical distribution comprising positive and negative main conductors and a neutral conductor, a balancer having one terminal connected to said neutral conductor, means responsive to an unbalance in said system for making the other terminal of said balancer the same polarity as the one of said main conductors across which and the neutral conductor the difference in voltage is least, means responsive to a predetermined relation between the voltage of said balancer and the voltage difference between said one of the main conductors and said neutral conductor for connecting said balancer across them, and means for disconnecting said balancer from said main conductor in response to a reversal of current flow between said balancer and said system.

In witness whereof, I have hereunto set my hand this 25th day of October, 1927.

THEOPHILUS F. BARTON.

CERTIFICATE OF CORRECTION.

Patent No. 1,713,162.  Granted May 14, 1929, to

THEOPHILUS F. BARTON.

It is hereby certified that error appears in the printed specification of the above numbered patent requiring correction as follows: Page 1, at the beginning of the specification insert the following paragraph:

"My invention relates generally to systems of electrical distribution and more particularly to direct current three-wire systems.";

and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.